Aug. 3, 1965     O. J. ALLEN     3,198,486
CAMPER JACK

Filed Sept. 26, 1963     4 Sheets-Sheet 1

INVENTOR.
ORRIS J. ALLEN
BY
Van Valkenburgh and Fields
ATTORNEYS

Aug. 3, 1965     O. J. ALLEN     3,198,486
CAMPER JACK

Filed Sept. 26, 1963     4 Sheets-Sheet 3

INVENTOR.
ORRIS J. ALLEN
BY
Van Valkenburgh and Fields
ATTORNEYS

Aug. 3, 1965  O. J. ALLEN  3,198,486
CAMPER JACK
Filed Sept. 26, 1963  4 Sheets-Sheet 4

INVENTOR.
ORRIS J. ALLEN
BY
Van Valkenburgh and Fields
ATTORNEYS

United States Patent Office 3,198,486
Patented Aug. 3, 1965

3,198,486
CAMPER JACK
Orris J. Allen, Lakewood, Colo., assignor, by mesne assignments, to Salton Products, Inc., a corporation of Colorado
Filed Sept. 26, 1963, Ser. No. 311,703
10 Claims. (Cl. 254—45)

This invention relates to a jack, and more particularly to a jack for use in placement of a camper on or removal from a pickup truck or the like and as a support for storing a camper when not in use.

In recent years, the use of campers transported on pickup trucks or the like and used for sleeping or other purposes thereon has become very popular. However, the problem of loading and unloading the camper, as well as storage when not in use, has become acute. Normally, it is desired to use the pickup truck for other purposes when it is not being used for transporting the camper, but the camper must be unloaded from the bed of the pickup truck, which is difficult because of the weight and size of the camper, while the camper must be replaced in the truck bed for use again. In addition, it is normally desirable to store the camper, between periods of use or during winter seaons, so that it is at least slightly elevated but is readily reloaded into the truck bed. A camper can be easily handled by an overhead crane or hoist, but the usual owner of a camper does not possess the same. Also, a camper can be stored on blocks or other types of supports, but the camper then must be moved rearwardly from the truck bed, as by being slid out of the truck bed. However, this is a laborious process and the reloading of the camper is even more laborious. Different types of jacks have been proposed for loading and unloading a camper from a pick-up truck bed, but these have been unsatisfactory from the standpoint of either expense or operation, the latter including cumbersomeness, slowness of use, requiring several persons for operation and instability of the camper during movement.

Among the objects of this invention are to provide a novel camper jack; to provide such a camper jack, three of which may be used for mounting a camper on the bed of a truck or removing it therefrom; to provide such a camper jack, three or more of which may be used for restoring a camper when not in use; to provide such a camper jack which itself may be readily stored when not needed to support the camper; to provide such a camper jack with which one side of the camper may be raised or lowered at a time; to provide such a camper jack and a bracket cooperating therewith which will produce a minimum of lateral thrust on the jack while the camper is supported, particularly while the camper is being raised or lowered; to provide such a bracket which may be modified for attachment to different types of campers; to provide such a camper jack which is stable during use; to provide such a camper jack, certain parts of which may be readily separated for storage; and to provide such a camper jack which is of relatively simple construction and is easy to use.

Additional objects and the novel features will become apparent from the description which follows, taken in conjunction with the accompanying drawings in which.

Figure 1:
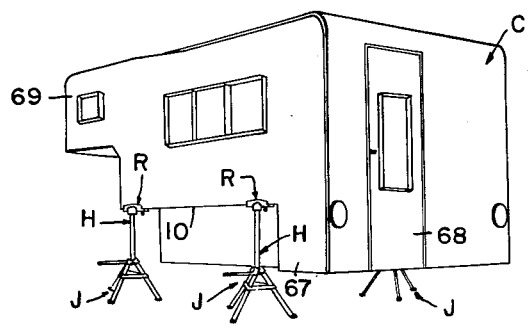
FIG. 1 is a perspective rear view, on a reduced scale of a camper supported by three camper jacks, each constructed in accordance with this invention.

In accordance with this invention, a camper C may be supported by jacks J, as in FIG. 1, when the camper is to be mounted on a pickup truck. Also, the jacks may be lowered to support the camper for storage. Each jack J engages a bracket R mounted at the lower corner of a side ledge 10 of the camper, the brackets R being modified, as described later, to accommodate different types of campers. Only three jacks are needed to support the camper, two jacks being utilized on one side adjacent the front and rear of the camper, as shown, and one at the center of the camper, on the opposite side, with the brackets R being mounted in corresponding positions. When elevating the camper to a position in which a pickup truck may be backed under the camper, for loading purposes, the jacks J may be raised alternately on opposite sides of the camper, as from four to six inches at a time, when one person only is operating the jacks. Of course, when two persons are operating the jacks, the two jacks on one side may be raised alternately and the jack on the opposite side raised slowly so as to maintain the camper as level as possible. With three persons, the jacks may be raised simultaneously, until the desired height is reached. Or, the jacks may be raised in sequence by one person, in the event the distance the camper is to be raised is not sufficient to cause the camper to become unstable. After the camper has been elevated to a position which will clear the bed of the pickup truck, the truck may be backed under the camper, it being noted that the jacks will clear the sides of the bed. When the truck is in position, the jacks are lowered, either simultaneously or in sequence, depending on the number of persons available to operate the jacks. After the camper comes to rest on the bed, the jacks are removed for storage thereof, in a manner described later. For removal of the camper from the bed of the pickup truck, the jacks are assembled and placed in the position of FIG. 1, then raised in turn sufficiently for clearance of the camper, whereupon the truck may be driven out from under the camper. The camper may remain on the jacks, in elevated position, in the event the camper is to be returned to the bed within a short time. Or, the jacks may be lowered, either consecutively or simultaneously, depending on the number of persons available for operation of the jacks, until the jacks are at their lowermost position, in which position the camper may remain on the jacks for storage. Each jack J preferably includes a hydraulic jack H, to reduce the energy required for operation and to minimize the time required for either loading or unloading operations.

Figure 2:
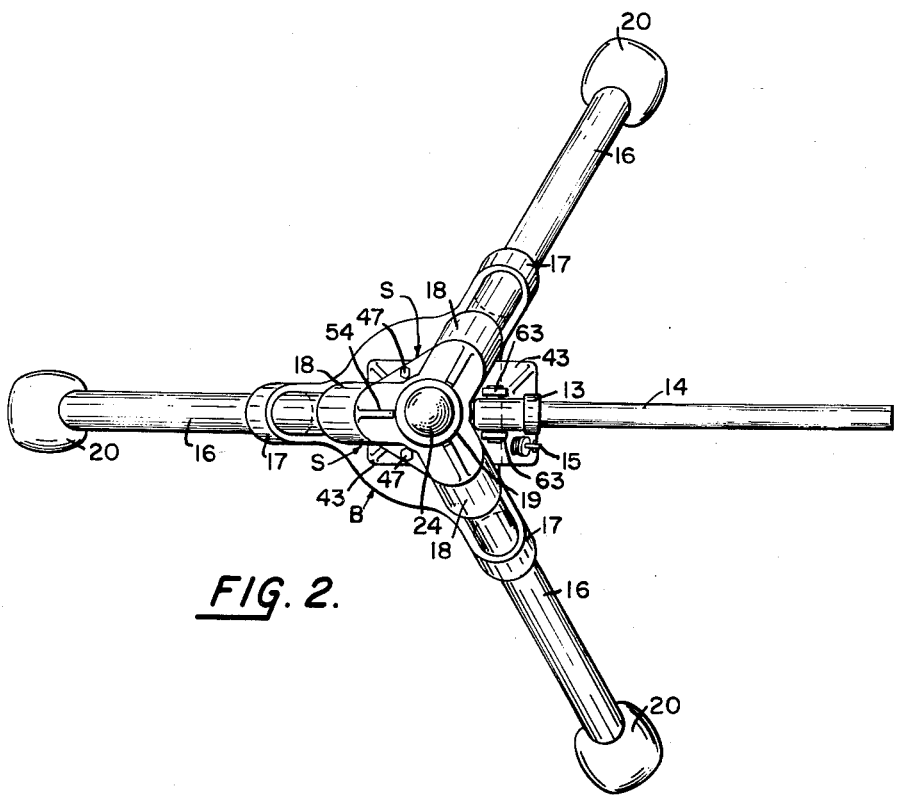
FIG. 2 is a top plan view of one of the camper jacks of FIG. 1.
Figure 3:
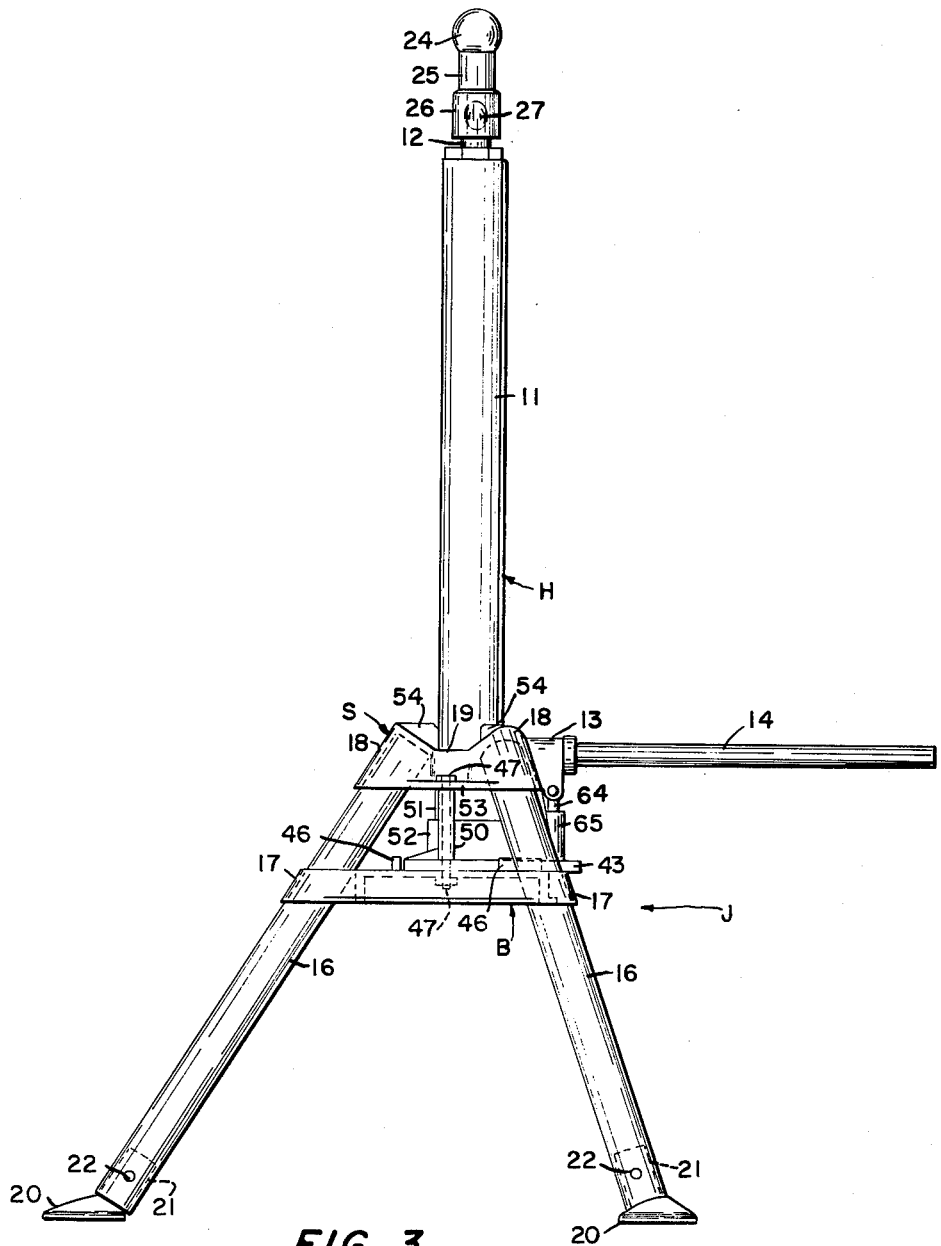
FIG. 3 is a side elevation of the camper jack of FIG. 2.

Each hydraulic jack H is conventional in construction and includes, as in FIGS. 2 and 3, a vertical hydraulic cylinder 11 having an extensible piston rod 12, which is rotatable in cylinder 11, a pivoted socket 13 for a handle 14, used for pumping hydraulic fluid into cylinder 11 for elevating piston rod 12, and an internal valve controlled by a valve rod 15, for releasing the hydraulic fluid and lowering piston rod 12. Each support for the hydraulic jack H includes three removable legs 16, each of which extends through a sleeve 17, having an angularly disposed hole and formed at the corner of a triangularly shaped jack base B, as in FIG. 8, and the upper end of which extends into an angularly disposed socket 18 at the corner of a triangular leg seat S, as in FIG. 7, having a central collar 19 which encircles the jack cylinder 11. Jack base B and leg seat S are attached to jack J, as described later, to form one storage unit, while legs 16 are readily removable for storage. Also, each leg 16 is readily slipped through a sleeve 17 and into the corresponding socket 18 when the camper jack is being assembled for use. Each leg 16 is conveniently tubular and at its lower end is provided with an angularly disposed foot 20 having a cylindrical extension 21 which extends into the lower end of the leg and is attached thereto, as by a transverse pin 22. As will be evident from FIG. 2, each leg 16 may be positioned so that its foot 20 will extend directly outwardly, the bottom of each foot thus providing adequate bearing area.

Figure 4:
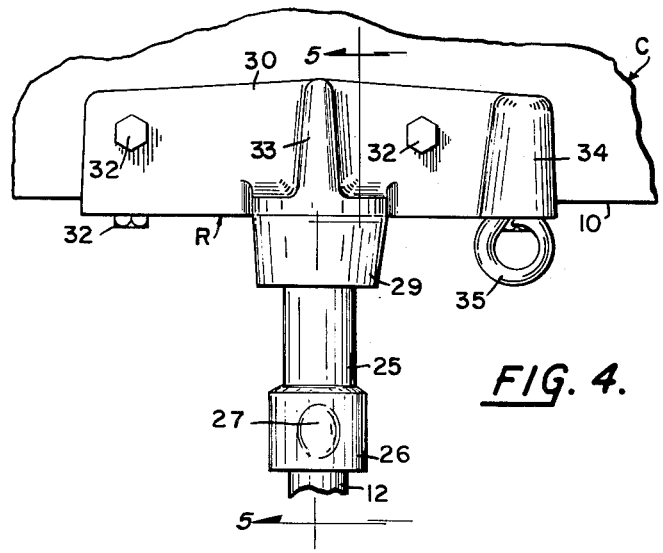
FIG. 4 is a fragmentary side elevation, on an enlarged scale, of a portion of the camper, a bracket and the upper end of the jack.
Figures 5, 6:
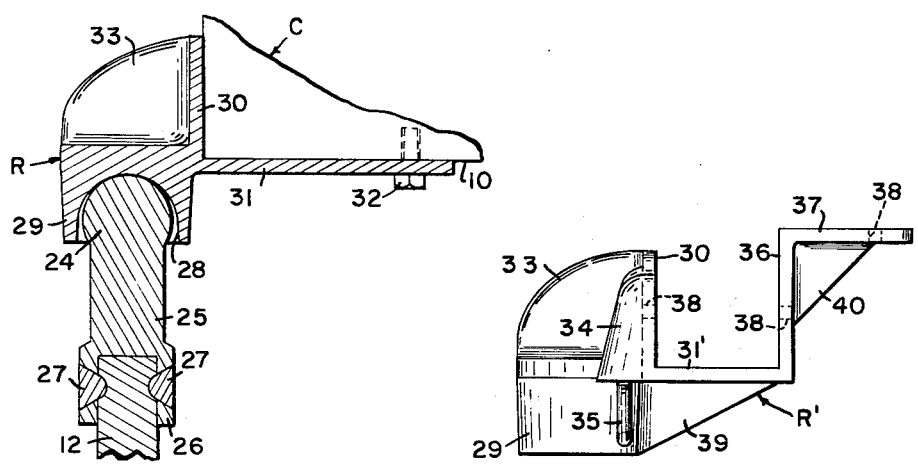
FIG. 5 is a fragmentary vertical section, taken along line 5—5 of FIG. 4.
FIG. 6 is an end elevation of a modified bracket.

A generally spherical ball 24, as in FIG. 3, is mounted on the upper end of piston rod 12 of each hydraulic jack H, as by being provided with a stem 25 having a cylindrical, depending flange 26 which encircles the upper end of the piston rod and is conveniently provided with diametrically opposite holes for the deposition of weld metal 27 to attach the ball 24 to the piston rod 12, as in FIGS. 3 and 5. Each ball 24 is adapted to engage a hemispherical recess 28 in a socket 29 of a bracket R, as in FIG. 5, to provide a ball and socket joint which accommodates tipping of the camper during sequential movement upwardly or downwardly of the jacks, thereby minimizing lateral thrust on the hydraulic jack H and its supporting structure. The bracket R of FIGS. 4 and 5 is formed in any suitable manner, conveniently by casting from a light weight metal, such as aluminum, and is particularly adapted for attachment to a so-called "flat ledge" type of camper in which the ledge 10 of FIG. 1 extends inwardly as a planar surface above the side wall of the bed of the pickup truck. Thus, bracket R is provided with an upright outer flange 30 which engages the outside of the camper C and a lower flange 31 which engages the underside of ledge 10, as in FIG. 5, the bracket being conveniently attached to the trailer by bolts 32 which extend through the respective flanges 30 and 31. Socket 29 is preferably positioned outwardly from the outer wall of the camper, to provide additional clearance for the legs 16 when the truck is driven under or out from under the camper, while for reinforcing purposes, the upper end of socket 29 may be connected to outer flange 30 by a vertical rib 33. Each jack J is conveniently positioned with two of the legs 16 in longitudinal alignment with the side of the camper C and the third leg extending laterally and outwardly in a direction perpendicular to the side wall, as in FIG. 1, to provide maximum clearance for the wheels of the pickup truck. Of course, the jack should be positioned so that handle 14 can be operated from the outside. Each bracket R is also conveniently provided with an enlargement 34, as at one end of outer flange 30, in which is embedded, during casting, an eye 35 adapted to receive a hook attached to one end of a turnbuckle (not shown), the opposite end of which is provided with an eye for engaging a hook carried by a bracket (not shown) mounted on the side of the pickup bed, so that the camper may be held in position on the bed by tightening the turnbuckle at each of the brackets R. Such tightening devices are of advantage in preventing the camper from bouncing out of the pickup bed when travelling over rough roads, as well as preventing the camper from tending to slide out of the pickup bed when travelling up steep slopes. Such turnbuckle connections are, of course, readily removed or replaced. In addition, the jacks J are readily positioned for supporting the camper, prior to removal from the pickup bed, since the legs 16 are readily slipped into position and each jack J placed beneath the corresponding bracket R, whereupon the ball 24 and piston rod 12 may be lifted manually until the ball 24 enters the recess 28 of the socket 29. Thus, each jack J may be accurately positioned with respect to the corresponding bracket R, prior to the production of hydraulic pressure by handle 14. As will be evident, during lifting or lowering of the camper C by operation of the jacks sequentially, the camper C will tip to one side or the other or toward one corner or another during such operations, but the ball and socket joint between each jack J and the corresponding bracket R, as well as rotation of piston rod 12 in cylinder 11, will accommodate such tipping without undue lateral forces on the jack, which increases the stability of the jacks and camper during raising or lowering operations.

A modified form of bracket R', as in FIG. 6, may be utilized for connection to a so-called "drop ledge" camper, in which the ledge corresponding to ledge 10 of FIGS. 1 and 5 has a downwardly extending offset at the outer edge. Such a bracket may include a similar socket 29, the upper end of which is reinforced by a rib 33 connecting with the outer flange 30, and an enlargement 34 at one end of flange 30, in which an eye 35 is embedded. However, the lower flange 31' of bracket R' is narrower than lower flange 31 of bracket R and, in addition, is provided along its rear edge with an upstanding rear flange 36 provided at its upper edge with a rearwardly extending flange 37. Flange 30 abuts against the outside wall of the camper, flange 31 abuts against the underside of the drop ledge, flange 36 abuts against the inside edge of the drop ledge, while flange 37 abuts against the underside of the camper inwardly from the drop ledge. Flanges 30, 36 and 37 are conveniently provided with holes 38 for bolts corresponding to bolts 32 of FIGS. 4 and 5, for attachment of the bracket R' to the camper. Also, socket 29 may be further reinforced by a rib 39 extending to the underside of flange 31', while a reinforcing rib 40 may also extend between flanges 36 and 37. As will be evident, the socket 29 of bracket R' is spaced outwardly from the outer edge of the camper, and the eye 35 may be used for securing the camper to the pickup bed by a turnbuckle clamp, as before.

Figure 8:
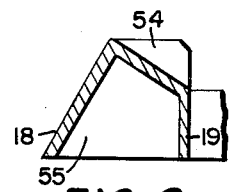
FIG. 8 is a fragmentary vertical section, taken along line 8—8 of FIG. 7.
Figure 9:
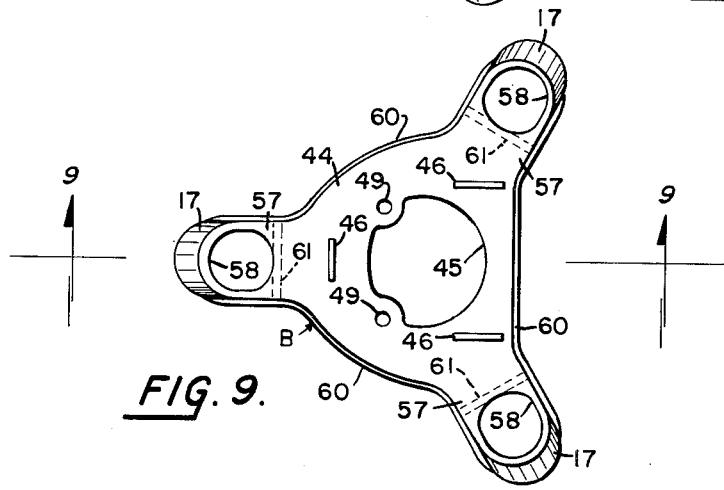
FIG. 9 is a top plan view, on an enlarged scale, of a base of the camper jack of FIGS. 2 and 3.

Each hydraulic jack H, as in FIG. 2, also includes a base plate 43 which rests on a flat surface 44 of jack base B, over a weight reducing, central aperture 45 of FIG. 9, base plate 43 being located in position by three upstanding ears 46. The hydraulic jack H is attached to the jack base B and leg seat S in any convenient manner, as by a pair of bolts 47 extending through holes 48 of FIG. 7 in leg seat S and holes 49 of FIG. 8 in jack base B, with a cylindrical spacing tube 50 surrounding each bolt to maintain the jack base and leg seat parallel. The length of spacing tubes 50 is preferably such that the jack H is clamped between the leg seat S and the jack base B, with the underside of leg seat S engaging the top of a reservoir of the hydraulic jack H having steps 51 and 52, as in FIG. 3. Thus, the hydraulic jack H, leg seat S and jack base B may remain attached together for storage as a unit, when not in use.

Figure 7:
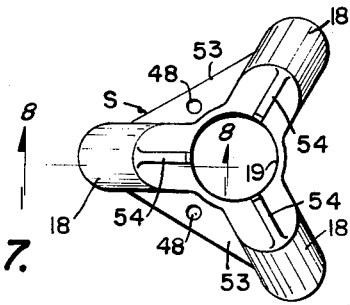
FIG. 7 is a top plan view of a leg seat of the camper jack of FIGS. 2 and 3, on a slightly enlarged scale.

The leg seat S may be formed in any suitable manner, as by casting, and in addition to the parts previously described, as in FIG. 7, may include a pair of lateral ribs 53 in which holes 48 are drilled and which join one socket 18 with the respective other two sockets, as well as three vertical ribs 54 which extend upwardly and inwardly from the top of each socket 18 to a position above collar 19 for engagement with cylinder 11 of hydraulic jack H, as in FIGS. 2 and 3. Each socket 18 is conveniently cast integrally with collar 19, while each recess 55 in a socket 18 is elongated at the bottom, as in FIG. 8, conveniently extending to collar 19, to facilitate insertion of the upper end of a leg 16 therein.

Figure 10:
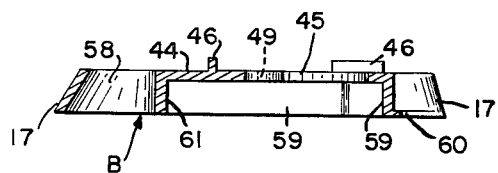
FIG. 10 is a horizontal section, taken along line 10—10 of FIG. 9.

The base B may also be formed by casting, or in any other suitable manner. In addition to the parts previously described, as in FIGS. 9 and 10, top surface 44 has three equally spaced extensions 57, at the outer end of each of which the respective collar 17 is formed, with an outwardly inclined outer wall, such as at 60° to the horizontal, and laterally elongated openings 58 therein to correspond to the legs 16 which extend therethrough. At each side of surface 44 and extensions 57, a flange 59 extends downwardly and is provided at the lower edge with an outwardly extending rib 60, for reinforcement purposes, which ribs merge into the corresponding sleeve 17. Also, the inner edge of sleeve 17 is reinforced by a depending flange 61, which extends between the corresponding flanges 59. As will be evident, when the weight of the camper comes on a hydraulic jack H, the forces transmitted by base plate 43 to jack base B will be transmitted through inclined sleeves 17 to inclined legs 16, and cause the outer edges of the sleeves to clamp the legs, thereby increasing the stability of the support. However, when the weight of the camper is removed, the legs 16 are no longer clamped by the sleeves 17 and the legs are thus easily removed. The clamping effect of the sleeves on the legs also permits a relatively loose fit of the upper ends of the legs in sockets 18, thereby decreasing manufacturing tolerance requirements and also contributing to the ease of removal and replacement of the legs 16, when the jacks are not under load. Thus, the recesses in sockets 18 may be elongated on the underside, such as extending inwardly to collar 19, as described previously.

As indicated previously, the hydraulic jacks H are conventional and, while a particular type has been illustrated, it will be understood that other types may be utilized. Thus, constructions may be utilized other than in which socket 18 is pivoted between ears 63, as in FIG. 2, and pivotally connected to a pump plunger 64, as in FIG. 3, which extends into a pump housing 65. Also, the placement of bleed valve control rod 15 may be varied, as well as the size and shape of the base plate 43 and the reservoir having steps 51 and 52. As will be evident, both jack base B and leg seat S may be modified to accommodate other types of hydraulic jacks.

While the camper C illustrated in FIG. 1 is a type in which the rear portion 67, having a door 68, extends rearwardly and below the bed of a pickup truck, and is also provided with an upper extension 69 which extends over the cab of the truck, the jacks J may be utilized with other types of campers, such as having no front extension 69 or which do not extend rearwardly past the truck bed, as well as other types of variations of the construction shown.

From the foregoing, it will be evident that the objects and requirements hereinbefore set forth have been fulfilled to a marked degree. A camper jack has been provided which is easy to use, easy to store and which can be set up in a very short time. Thus, the removable legs are readily inserted through the sleeves of the jack base and into the sockets of the leg seat, while the inclined outer walls of the sleeves clamp the legs when weight is placed on the jack. With a set of three jacks, one person can raise or lower a camper to or from a pickup truck. Thus, by alternately raising or lowering one side and then the other, one person can raise or lower the camper. Also, the camper jack is provided with separable legs which facilitate storage, while the jack base and leg seat are adapted to remain attached to the hydarulic jack, for storage purposes.

Although a preferred embodiment of this invention has been illustrated and described, it will be understood that other embodiments may exist and that various changes and variations may be made without departing from the spirit and scope of this invention.

What is claimed is:
1. A camper jack comprising:
    elevating means having a base plate and a member movable upwardly and downwardly;
    a series of spaced supporting legs;
    a support base having peripherally spaced sleeves having inclined outer walls and through which said legs freely extend, the base plate of said elevating means resting on said support base; and
    a leg seat having an opening therethrough spaced above said support base and having sockets in alignment with said sleeves and into which the upper ends of said legs freely extend, said elevating means extending through said opening.
2. A camper jack, as set forth in claim 1, wherein:
    said elevating means is provided with a step above said base plate; and
    means for clamping said leg seat against said step.
3. A camper jack, as set forth in claim 2, wherein said clamping means includes:
    at least two tubular spacers disposed between said leg seat and said support base; and
    bolts extending through said spacers to hold said leg seat and said base in fixed relation and to clamp said leg seat against said step of said elevating means.
4. A camper jack, as set forth in claim 1, wherein said elevating means comprises a hydraulic jack having a cylinder; and
    said leg seat is provided with:
    a central collar surrounding said hydraulic jack cylinder, said sockets being inclined outwardly and spaced around said collar; and
    a rib extending inwardly and upwardly from the upper end of each socket to a position above said collar.
5. A camper jack, as set forth in claim 4, wherein each said socket has a recess therein which is radially elongated at the bottom thereof.
6. A camper jack, as set forth in claim 4, including:
    lateral ribs extending between one of said sockets and two other sockets; and
    holes in said lateral ribs for receiving means for attaching said leg seat to said support base.
7. A camper jack, as set forth in claim 1, including spaced flanges extending upwardly from said support base and adapted to position said base plate on said support base.
8. A camper jack, as set forth in claim 1, wherein said support base is provided with:
    a central flat surface on which said base plate of said elevating means rests, said surface having a radial extension to each said sleeve; and
    flanges depending from the outer edges of said central surface and said extensions and merging with said sleeves.
9. A camper jack, as set forth in claim 8, wherein:
    each said sleeve is provided with a radially elongated, upper aperture; and including:
    a depending flange at the inner edge of each said aperture, said latter depending flanges extending between the corresponding side flanges.
10. A camper jack, as set forth in claim 9, wherein said central flat surface is provided with:
    a central aperture;
    a series of spaced upstanding flanges adapted to position said base plate; and
    at least two holes for receiving means for attaching said leg seat to said support base.

References Cited by the Examiner

UNITED STATES PATENTS 2,214,440  9/40  Rothery _____ 254—1 X

FOREIGN PATENTS 166,942  2/56  Australia.
846,533  6/39  France.
531,110  12/40  Great Britain.

WILLIAM FELDMAN, *Primary Examiner.*

MILTON S. MEHR, *Examiner.*